(12) United States Patent
Hallberg et al.

(10) Patent No.: US 7,369,756 B2
(45) Date of Patent: May 6, 2008

(54) METHOD FOR DECODING NON-DV DATA STORED IN A DV FORMAT

(75) Inventors: Bryan Severt Hallberg, Vancouver, WA (US); Jeff Brian Sampsell, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 815 days.

(21) Appl. No.: 10/684,276

(22) Filed: Oct. 13, 2003

(65) Prior Publication Data

US 2004/0076401 A1   Apr. 22, 2004

Related U.S. Application Data

(62) Division of application No. 09/465,415, filed on Dec. 16, 1999, now Pat. No. 7,298,959.

(51) Int. Cl.
*H04N 7/01* (2006.01)
*H04N 5/775* (2006.01)
*H04N 7/10* (2006.01)

(52) U.S. Cl. .................. 386/131; 386/124; 375/240.26

(58) Field of Classification Search ........... 375/240.26; 386/124, 131
See application file for complete search history.

(56) References Cited

U.S. PATENT DOCUMENTS

| | | | |
|---|---|---|---|
| 5,510,899 A | 4/1996 | Kim | |
| 5,526,131 A | 6/1996 | Strolle et al. | |
| 5,535,208 A | 7/1996 | Kawakami et al. | |
| 5,543,932 A | 8/1996 | Chang et al. | |
| 5,563,714 A | 10/1996 | Inoue et al. | |
| 5,579,183 A | 11/1996 | Van Gestel et al. | |
| 5,587,789 A | 12/1996 | Lee et al. | |
| 5,589,993 A | 12/1996 | Naimpally | |
| 5,596,581 A | 1/1997 | Saeijs et al. | |
| 5,619,337 A | 4/1997 | Naimpally | |
| 5,623,344 A | 4/1997 | Lane et al. | |
| 5,648,960 A | 7/1997 | Sakazaki et al. | |
| 5,666,461 A | 9/1997 | Igarashi et al. | |

(Continued)

FOREIGN PATENT DOCUMENTS

JP        2001094552 A  *  4/2001

(Continued)

OTHER PUBLICATIONS

Goswami, R. et al. "MPEG-2 Video Data Simulator: a Case Study in constrained HW-SW Codesign". Proceedings of the Twelth International Conference on VLSI Design, Jan. 1999, pp. 128-131.*

(Continued)

*Primary Examiner*—Thai Q. Tran
*Assistant Examiner*—David N Werner
(74) *Attorney, Agent, or Firm*—Chernoff, Vilhauer, McClung & Stenzel

(57) ABSTRACT

A method for extracting and decoding data stored in a DV format having sequential DIF blocks that include a header and a payload portion, where the stored data is not decodable under the DV format in which the data is stored. The data is sequentially extracted and decoded from the payload portions of respective DIF blocks.

10 Claims, 6 Drawing Sheets

U.S. PATENT DOCUMENTS

| | | | |
|---|---|---|---|
| 5,668,810 A | 9/1997 | Cannella, Jr. | |
| 5,668,916 A | 9/1997 | Fujinami | |
| 5,684,917 A | 11/1997 | Yanagihara et al. | |
| 5,687,275 A | 11/1997 | Lane et al. | |
| 5,717,641 A | 2/1998 | Ando et al. | |
| 5,717,816 A | 2/1998 | Boyce et al. | |
| 5,727,113 A | 3/1998 | Shimoda | |
| 5,729,648 A | 3/1998 | Boyce et al. | |
| 5,729,649 A | 3/1998 | Lane et al. | |
| 5,739,862 A | 4/1998 | Cen | |
| 5,754,651 A | 5/1998 | Blatter et al. | |
| 5,757,421 A | 5/1998 | Kato et al. | |
| 5,768,466 A | 6/1998 | Kawamura et al. | |
| 5,771,335 A | 6/1998 | Lee | |
| 5,774,441 A | 6/1998 | Nakagawa | |
| 5,778,143 A | 7/1998 | Boyce | |
| 5,784,527 A | 7/1998 | Ort | |
| 5,790,177 A | 8/1998 | Kassatly | |
| 5,793,927 A | 8/1998 | Lane | |
| 5,802,240 A | 9/1998 | Asai | |
| 5,802,242 A | 9/1998 | Kawamura et al. | |
| 5,812,734 A | 9/1998 | Shimoda et al. | |
| 5,832,085 A | 11/1998 | Inoue et al. | |
| 5,832,172 A | 11/1998 | Jeon | |
| 5,854,840 A | 12/1998 | Cannella, Jr. | |
| 5,867,625 A | 2/1999 | McLaren | |
| 5,872,933 A | 2/1999 | Kanai et al. | |
| 5,909,257 A | 6/1999 | Onishi et al. | |
| 5,970,392 A | 10/1999 | Hatae | |
| 5,987,126 A | 11/1999 | Okuyama et al. | |
| 6,101,215 A | 8/2000 | Takeda et al. | |
| 6,233,282 B1 | 5/2001 | Guerrera | |
| 6,253,019 B1 | 6/2001 | Yanagihara et al. | |
| 6,333,950 B1 | 12/2001 | Karasawa | |
| 6,366,731 B1 * | 4/2002 | Na et al. | 386/83 |
| 6,430,356 B1 | 8/2002 | Hara et al. | |
| 6,442,630 B1 | 8/2002 | Takayama et al. | |
| 6,507,673 B1 | 1/2003 | Wang et al. | |
| 6,532,232 B1 | 3/2003 | Goodwin, III | |
| 6,791,947 B2 | 9/2004 | Oskouy et al. | |
| 6,826,181 B1 * | 11/2004 | Higashida et al. | 370/390 |
| 7,298,959 B1 * | 11/2007 | Hallberg et al. | 386/46 |
| 2004/0042767 A1 * | 3/2004 | Defrance et al. | 386/111 |
| 2004/0105658 A1 * | 6/2004 | Hallberg et al. | 386/52 |

FOREIGN PATENT DOCUMENTS

WO      WO 9713371 A1 *    4/1997

OTHER PUBLICATIONS

Espacenet Patent Family listing for JP 2001-094552 A.*
Tewell, Thomas, "DV Coding: How it Works with IEEE-1394," Presented Jul. 29, 1997, http://desktopvideo.miningco.com/library/weekly/aa032698.htm.
CEI-IEC 61883-1 International Standard *Part 1* Consumer audio/video equipment—Digital interface.
CEI-IEC 61883-2 International Standard *Part 2* Consumer audio/video equipment—Digital interface.
IEEE Standard for a High Performance Serial Bus The Institute of Electrical and Electronics Engineers, Inc.—1996 (392 pages).

* cited by examiner

METHOD FOR DECODING NON-DV DATA STORED IN A DV FORMAT

CROSS-REFERENCE TO RELATED APPLICATIONS

This application is a division of application Ser. No. 09/465,415, filed Dec. 16, 1999 now U.S. Pat. No. 7,298,959.

BACKGROUND OF THE INVENTION

The present invention relates to a digital video recorder and, more particularly, to a method and apparatus for storing a compressed MPEG-2 transport data stream with a conventional digital video recorder.

A conventional digital video (DV) recorder records a digitized version of an analog television signal. The analog signal may be the signal of the NTSC (National Television Systems Committee) color television system of the United States and Japan, the PAL (Phase Alteration Line Rate) television system of parts of Europe, or the SECAM (Se'quentiel Couleur 'a Memoire) television system of France, Russia and eastern Europe. For example, to digitally record the analog television signal of the NTSC system, the separate luminance and chrominance signals of the video signal are first sampled and quantized. Intraframe compression is applied to the digital data representing the video signal using techniques such as adaptive quantization (AQ), discrete cosine transformation (DCT), and variable length coding (VLC). Following compression, error correction is added to the data. The audio portion of the signal is processed in a similar manner. The digital audio and video data are copied to data elements of a digital video (DV) frame data structure and the audio and video data elements of the DV frame structure are stored as separate segments of recording tracks on a magnetic tape.

The input and output of most DV recorders are by means of isochronous data transport as defined by the IEEE 1394-1995, STANDARD FOR A HIGH PERFORMANCE SERIAL BUS, incorporated herein by reference. The IEEE 1394 standard defines a basic mechanism for real time data transport including an isochronous data packet 10, as illustrated in FIG. 1. However, the IEEE 1394 standard does not establish the protocols needed for specific application requirements such as sending DV data over the bus. The format of the data structure for isochronous transmission of DV data across the IEEE 1394 serial bus is described in the International Standards Organization (ISO)/International Electrotechnical Commission (IEC) standards for DIGITAL INTERFACE FOR CONSUMER ELECTRONIC AUDIO/VIDEO EQUIPMENT, ISO/IEC 61883-1 and 61883-2, incorporated herein by reference. ISO/IEC 61883 defines the Common Isochronous Packet (CIP) format that is the basis of the 1394 DV data packet 30, illustrated in FIG. 2. The DV packet 30 comprises a CIP header 32 and a data field 34 of 480 bytes. For isochronous transmission on the IEEE 1394 bus, the DV data packet 30 is inserted into the data block of the IEEE 1394 isochronous data packet 10.

The IEEE 1394 bus sequences through three general phases: a cycle initiation phase, an isochronous phase, and an asynchronous phase. At the completion of the cycle initiation phase, transfer of isochronous data packets 10 is enabled. Devices connected to the bus having an allocated isochronous channel arbitrate for the bus. When a device gains access to the bus, it locates the start of the DV video frame and buffers the next 250 valid data packets to collect a complete DV frame. The CIP headers are discarded and the remaining 120,000 bytes defines an NTSC DV frame.

A 525 lines, NTSC DV video frame 50 comprises odd and even video fields and is encoded into ten digital interface format (DIF) sequences 52, as illustrated in FIG. 3. Each DIF sequence 54 comprises 150 DIF blocks 54 as illustrated in FIGS. 3 and 4. The 150 DIF blocks comprise a header (H) section 70, a subcode (SC) section 72, a video auxiliary (VAUX) section 74, and an audio and video data section 75. The audio data section 76 (indicated by a bracket in FIG. 4) comprises nine ($A_0$-$A_8$) audio DIF blocks. The video portion of the audio-video section 75 comprises 135 ($V_0$-$V_{134}$) video DIF blocks 78 (indicated by a bracket in FIG. 4). Referring to FIG. 3 each DIF block 54 includes an ID section 56 and a data section 58.

Digital recording of analog television signals provides a number of advantages over analog recording of those signals. However, television is in transition from an analog system to a digital system based on the MPEG-2 video compression standard. In the digital television (DTV) system, signals for each of the elements of a television program are digitized. The digital elementary data streams are compressed and then multiplexed into a single MPEG-2 transport data stream for transmission to a receiver. At the receiver, the transport stream is separated into the constituent elementary data streams which are decompressed and presented to the viewer. MPEG-2 transport data streams can be recorded with a dedicated MPEG video recorder. However, purchasing a dedicated video recorder to record MPEG video, particularly during the transition to DTV, is an undesirable additional expense.

What is desired, therefore, is a method of storing an MPEG transport data stream on a conventional DV format video recorder for playback on a DTV receiver.

SUMMARY OF THE INVENTION

The present invention overcomes the aforementioned drawbacks of the prior art by providing a method of processing data comprising the steps of copying the data to a data block formatted for digital video, and storing the data block on a storage medium in a digital video storage format. For example, packetized MPEG-2 transport stream data can be stored on a conventional digital video (DV) recorder by copying the transport stream data to one or more digital interface format (DIF) data blocks that are part of a digital video (DV) frame data structure. The DV frames containing the transport stream data are then recorded on video tape. The DV frames can be input to the video recorder by insertion into isochronous data transfer packets for transfer over an IEEE 1394 bus. On the other hand, if the data is formatted according to MPEG or another data formatting standard supported by IEEE 1394, the data may be transferred to the recorder before being inserted into a DV frame for storage. To present the stored data, the data is extracted from the DV frames and then decoded and presented using the customary applicable methods.

An apparatus for storing data with a digital video recorder is also disclosed comprising an accumulation buffer to accumulate a predetermined quantity of the data and a frame packetizer to copy the data to a data block of a digital video frame.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 5:
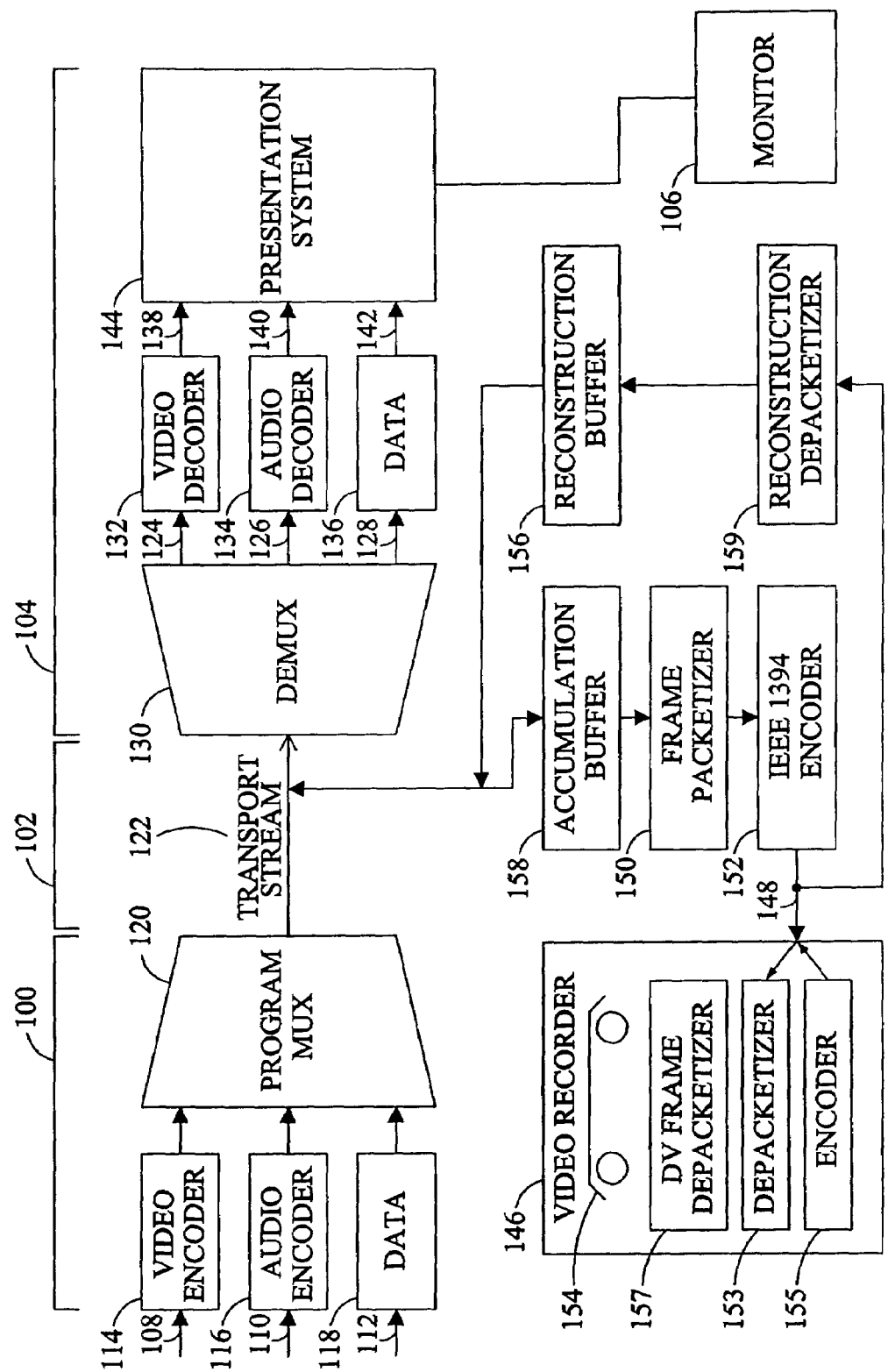
FIG. 5 is a block diagram of a digital television (DTV) system, including a digital video recorder.

Referring to FIG. 5, a digital television system comprises, generally, a transmitter or emission station 100 (indicated by a bracket), a transmission channel 102 (indicated by a bracket), a receiver 104 (indicated by a bracket), and a monitor 106. In the emission station 100, separate video 108, audio 110, and data 112 elementary data streams are appropriately encoded and compressed in video 114, audio 116, and data 118 encoders. The compressed elementary data streams are input to a program multiplexer 120 that combines the separate elementary data streams into a single transport data stream 122. The transport data stream 122 is transmitted to a receiver 104 over a transmission channel 102 such as a terrestrial or satellite broadcast system or a cable. At the receiver 104 which may be a set-top-box, the MPEG-2 transport data stream is separated into its constituent compressed video 124, audio 126, and data 128 elementary streams by a demultiplexer 130. The individual elementary data streams are decompressed and decoded in video 132, audio 134, and data 136 application decoders. The decompressed and decoded video 138, audio 140, and data 142 elementary streams are input to a presentation system 144 for presentation to the viewer, usually by display on the monitor 106.

The receiver 104 may be connected to a digital video (DV) format video recorder or camcorder 146 by a bus 148 conforming to the IEEE 1394-1995, STANDARD FOR A HIGH PERFORMANCE SERIAL BUS. In the present invention, the packetized MPEG-2 transport stream data 122 is inserted into a DV data packet by a frame packetizer 150. The DV frame is, in turn, inserted into an IEEE 1394 isochronous transfer data packet by an IEEE 1394 isochronous data encoder 152 for transmission over the IEEE 1394 bus 148 to the video recorder 146. In the video recorder 146, the DV data packets are recovered from the transfer data packets by a depacketizer 153 and the DV formatted frames are stored on a storage medium 154, usually a DV formatted magnetic videotape. At play time, the DV formatted data are inserted into an IEEE 1394 isochronous packet by an encoder 155 and transmitted over the bus 148 to the transmission channel 102 and to the receiver 104 where the MPEG data is extracted. The MPEG transport stream data are decoded by the application decoders 132, 134, and 136 for display by the presentation system 144.

The IEEE 1394 standard also provides a mechanism for transferring data in an MPEG format over the serial bus 148. As an alternative embodiment, the transport stream data 122 could be encoded in the IEEE 1394 encoder as MPEG formatted data encapsulated in an IEEE 1394 packet. At the recorder 146, the MPEG data would be extracted from the IEEE 1394 data packet in the depacketizer 153. In this embodiment, the MPEG data would be inserted into the DV data format by a DV frame packetizer 157 in the recorder 146. The DV formatted data would then be stored on the storage medium 154. At play time, the DV formatted data would be copied from the storage medium 154 by the encoder 155. In the encoder 155, the MPEG data is extracted from the DV formatted data packets and then the MPEG data is inserted into an IEEE 1394 data packet for transmission over the serial bus 148. In this alternative embodiment, the MPEG data would be recovered from the IEEE 1394 packet in the reconstruction depacketizer 159.

Figure 1:
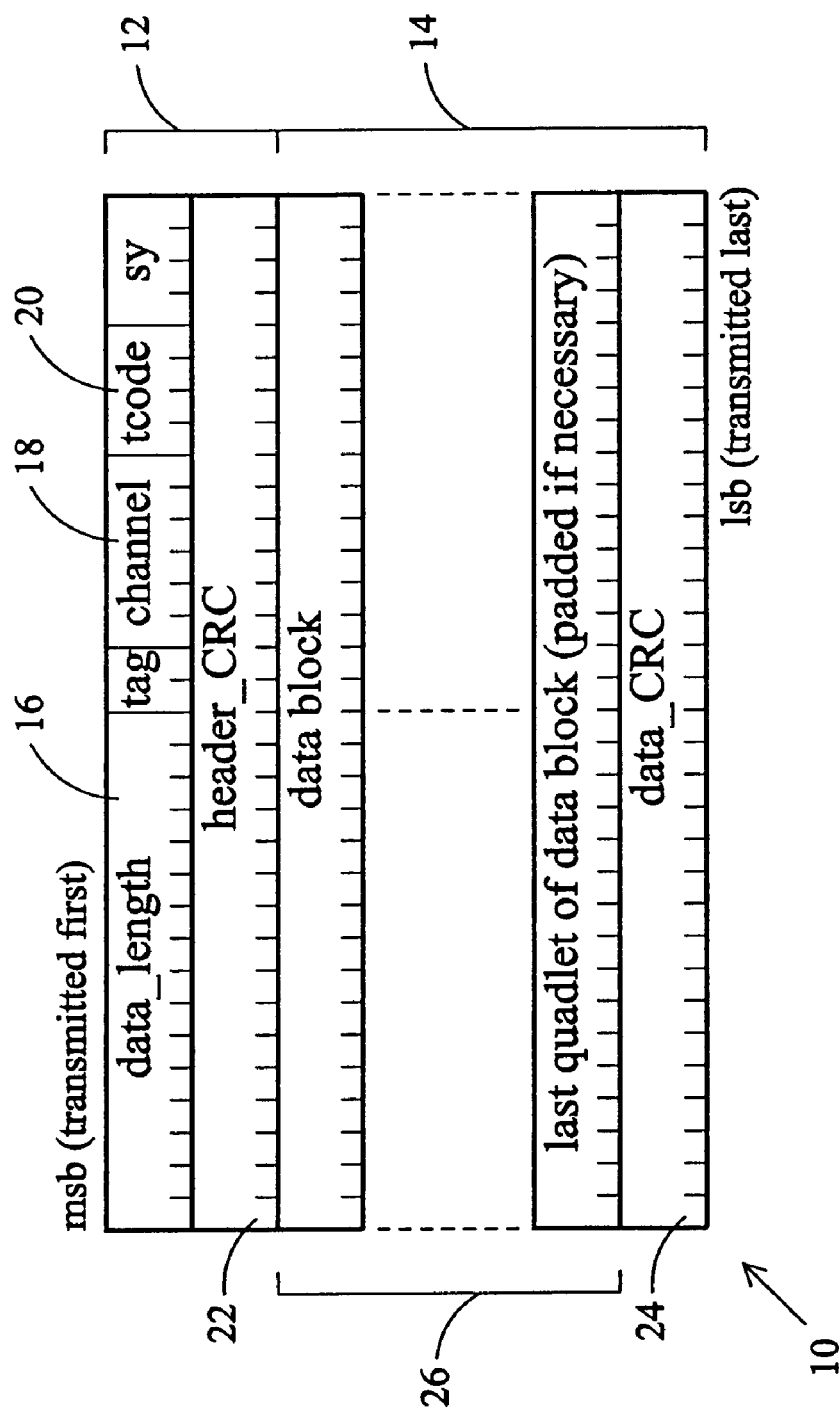
FIG. 1 is an illustration of the data structure of an IEEE 1394 isochronous data packet.

The IEEE 1394 high speed serial bus 148 provides for both asynchronous and isochronous data transfer. Isochronous operation guarantees a bandwidth for devices, such as audio/video devices, that require constant data transfer rates. Isochronous transactions use a single isochronous data packet format to perform multicast or broadcast transfers to one or more nodes (attached devices) on the bus 148. The format of an IEEE 1394 isochronous data packet is illustrated in FIG. 1. The packet comprises, generally, a header 12 and a data block 14. The header 12 specifies the length of the data in the packet 16, an isochronous channel number 18 that identifies the nodes to which the isochronous transfer is to be directed, a transaction code 20, and a header cyclic redundancy check (CRC) 22. A cyclic redundancy check (CRC) 24 is also provided for the data block 14. The maximum data payload 26 (indicated by a bracket) of the isochronous data packet 10 varies with the data capacity of the specific IEEE 1394 serial bus. The maximum payload 26 of the smallest isochronous packet (for a 100 Mbit per sec. bus) is 1024 bytes. To transfer digital video format (DV) data over the serial bus, a DV data packet 30, as illustrated in FIG. 2, is inserted into the data field of the IEEE 1394 isochronous data packet 10.

Figure 2:
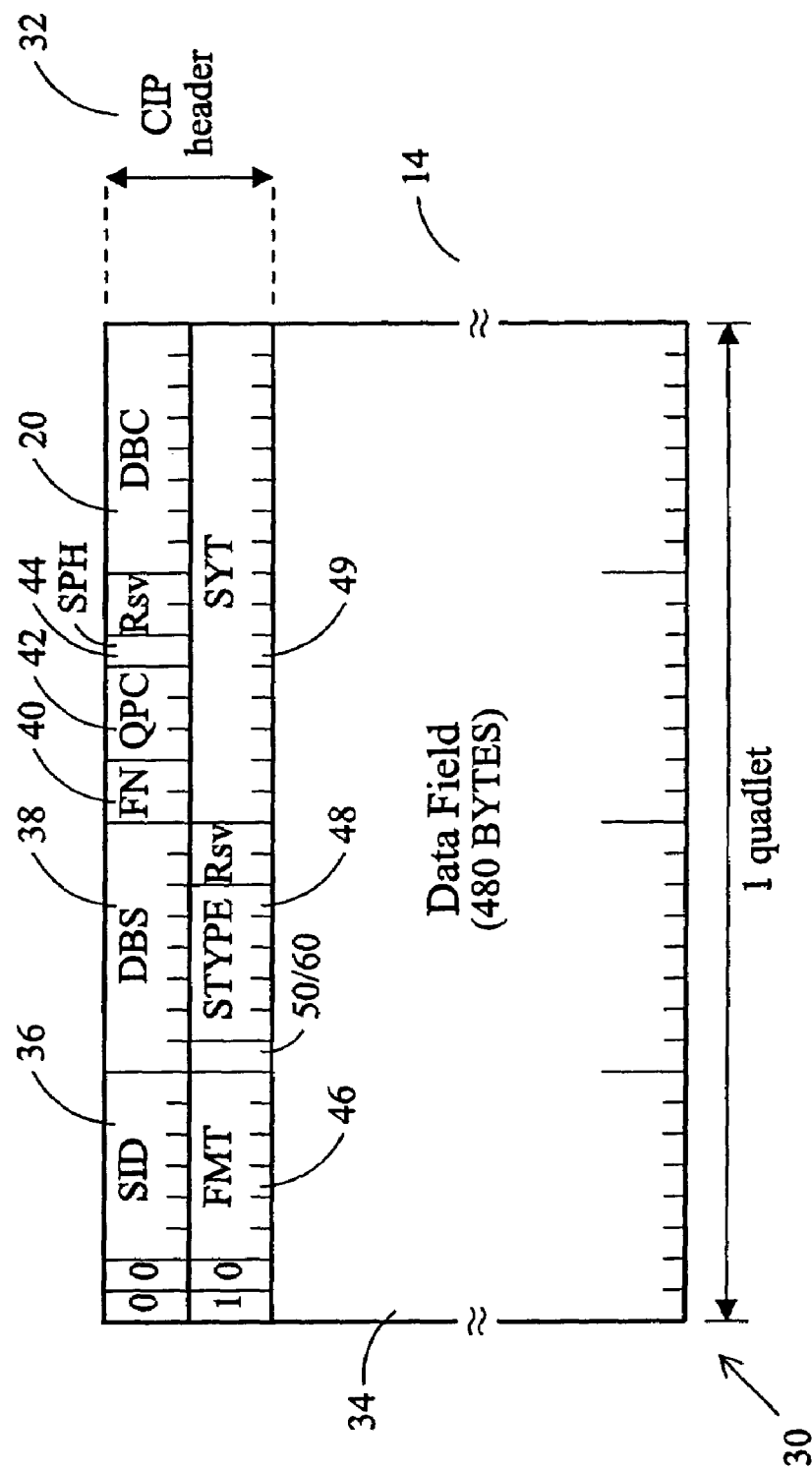
FIG. 2 is an illustration of the data structure of a digital video data packet to be inserted into the data block of the IEEE 1394 isochronous data packet of FIG. 1.

The structure of the DV data packet 30 is defined by ISO/IEC 61833-1 and 61833-2, DIGITAL INTERFACE FOR CONSUMER ELECTRONIC AUDIO/VIDEO EQUIPMENT, and is illustrated in FIG. 2. The DV data packet 30 comprises a CIP (Common Isochronous Packet) header 32 and a 480 byte data field 34. The CIP header 32 includes fields for source node identification (SID) 36, data block size (DBS) 38, function number (FN) 40, quadlet packing count (QPC) 42, source packet header (SPH) 44, format identification (FMT) 46, signal type (STYPE) 48, and a time stamp (SYT) 49 for synchronization of video frames.

Figure 3:
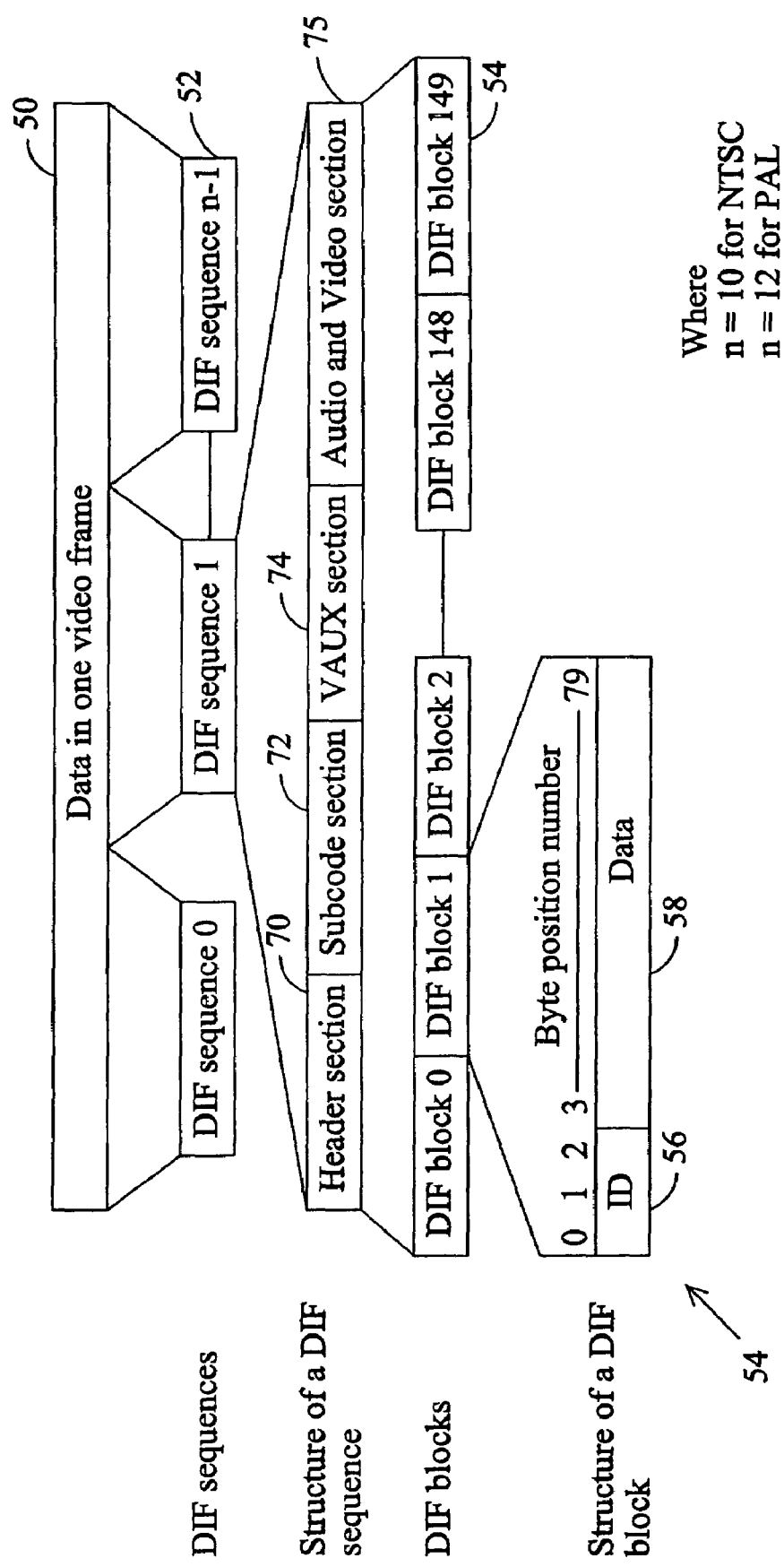
FIG. 3 is an illustration of the data structure of a digital video frame.
Figure 4:
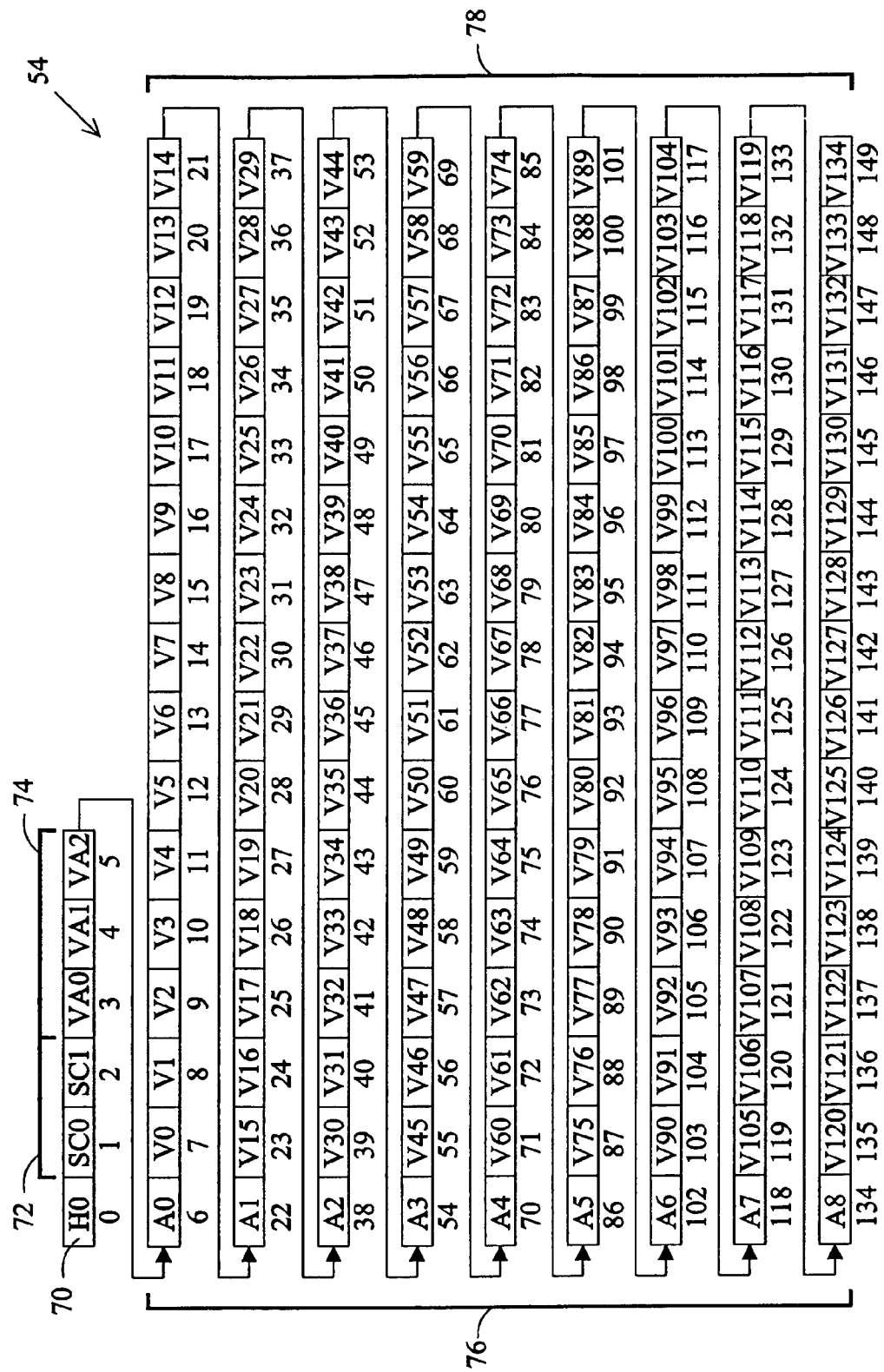
FIG. 4 is an illustration of the data structure of a digital interface format (DIF) sequence of the digital video frame of FIG. 3.

The data of a DV frame 50 for NTSC television is divided into ten digital interface format (DIF) sequences 52 as illustrated in FIG. 3. A DV frame for PAL television comprises 12 DIF sequences. As illustrated in FIGS. 3 and 4, each DIF sequence 52 comprises 150 DIF blocks 54. A DIF sequence 52 includes a header section (DIF block H0) 70, a subcode section (DIF blocks SC0 and SC1) 72, a video auxiliary section (DIF blocks VA0-VA2) 74, and an audio-video section 75. The audio-video section 75 comprises an audio section (DIF blocks A0-A8) 76 (indicated by a bracket in FIG. 4), and a video section (DIF blocks V0-V134) 78 (indicated by a bracket in FIG. 4). Referring again to FIG. 3, each DIF block comprises a three byte identification (ID) 56 and a 77 byte data section 58. The DIF block ID 56 indicates the type of DIF block (for example, video), the subsequence number and the DIF block number (0 to 134).

Figure 6:
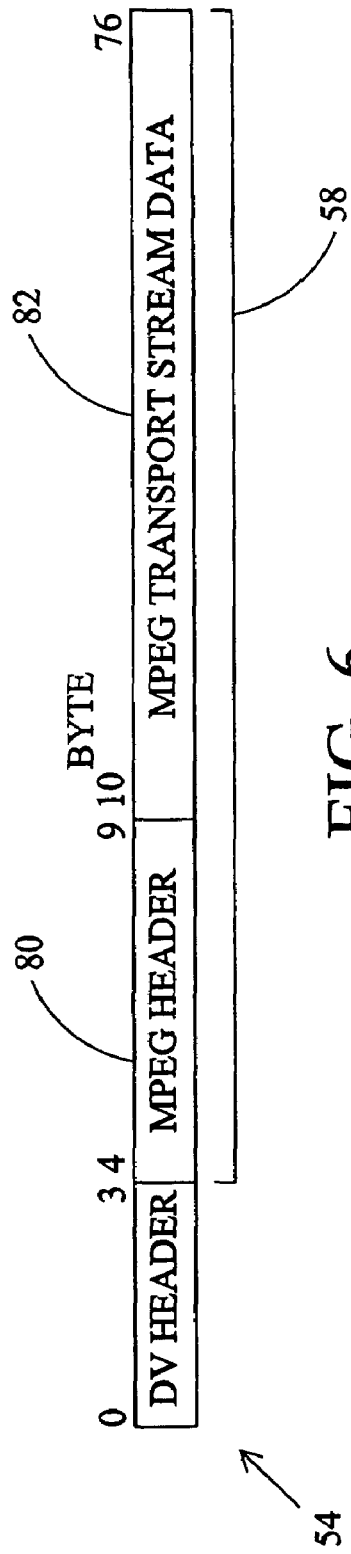
FIG. 6 is an illustration of the structure of a digital interface format (DIF) block of a DV frame in which MPEG transport stream data is stored.
Figure 7:
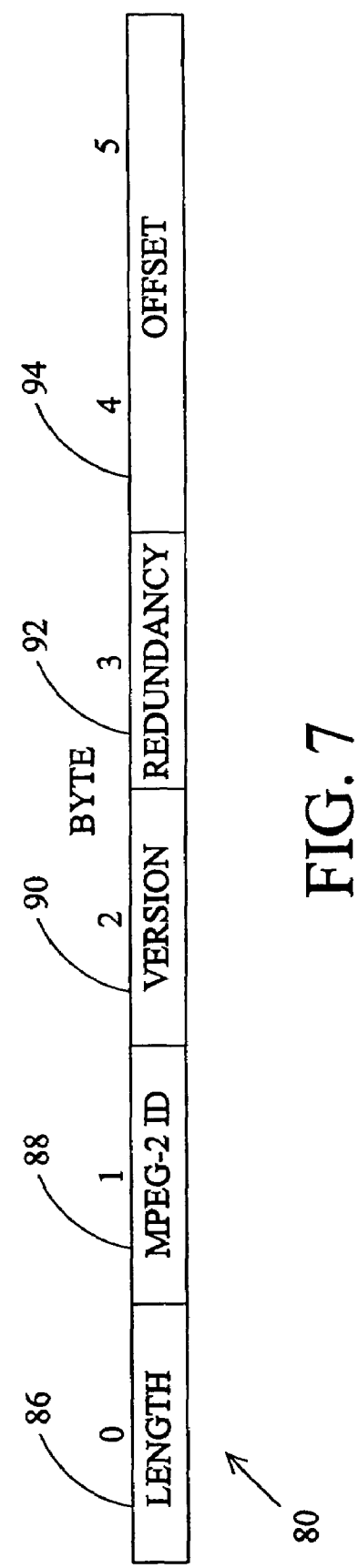
FIG. 7 is an illustration of an embodiment of a header for the MPEG transport stream data stored in a digital interface format (DIF) block of a DV frame as illustrated in FIG. 6.

In the present invention, MPEG-2 transport data stream packets are inserted into the last 76 bytes (the target data block) of the 77 byte data fields 58 of a plurality of video section DIF blocks 78 of one or more DV frames 50. Data is not stored in the first byte of the data field 58 because the DV recorder may alter the value of this byte as an error indicator. When writing to the recorder this byte is usually set to zero indicating no error, although other values are possible. DV frame packets 30, containing the DV formatted frames, are inserted into the payload of IEEE 1394 isochronous data transfer packets 10 for transfer over the IEEE 1394 bus. At the video recorder, the DV frames are extracted from the bus data stream and stored as DV formatted data on the videotape 154. Referring to FIG. 6, in an embodiment of the invention, the first six bytes of the target data field (the last 76 bytes of the data field 58) are used for MPEG header information 80 and the remaining 70 bytes are used to store the packetized MPEG-2 transport stream data 82. The MPEG header 80 is used by the decoder in extracting MPEG data from the DV frame structure 50 during playback. As illustrated in FIG. 7, the MPEG header comprises a length field 86 specifying the number of bytes of MPEG data in the DIF block starting from the MPEG ID byte 88 and ending at the last MPEG transport stream data byte of the DIF block 54. If a DIF block contains no MPEG data, the final four fields of the MPEG header 80 will contain no data and the length field 86 will be zero. The MPEG-2 ID field 88 contains a unique number that indicates that the data block of the DIF block contains MPEG-2 data. For example, the unique number might be the ASCII character "M" that has the value 77. The version field 90 contains a number indicating the version of the MPEG-2 standard and any MPEG-to-DV data storage specification applicable to the data in the block. On the other hand, the MPEG ID 88 and version 90 fields could be eliminated if the data is known to be MPEG-2 data or if the transport stream validity is checked by the MPEG decoder.

The redundancy field 92 of the DIF block contains an incrementing number indicating when new data is being stored in the DIF block. The DV format utilizes intraframe compression. The MPEG-2 compression process utilizes both intraframe and interframe data compression. The inventors realized that the 22.68 Mbps data capacity of the DV tape may substantially exceed the data rate of the MPEG transport stream 122. For example, standard definition MPEG-2 video has a maximum data rate of six Mbps. When the data rate capacity of the tape exceeds the data rate of the MPEG transport stream, the MPEG data can be stored redundantly on the tape. At 30 frames per second, approximately 200,000 bits of MPEG data must be stored in each DV frame structure 50. However, each DV frame 50 has a data capacity of 756,000 bits and the extra capacity can be used to redundantly store the MPEG data in multiple DIF blocks. If a DIF block is lost in transmission or storage, the data can be recovered from an identical DIF block in another DIF sequence. Further, when operating in a trick play mode the IEEE 1394 data stream may contain only fragments of each DV frame. Depending on trick play speed and data redundancy, it may be possible to reconstruct the original MPEG-2 transport stream from fragments of the DV frames. The redundancy value is a function of the DV frame structure capacity (756,000 bits) and the MPEG-2 data rate and can be expressed as:

$$\text{Redundancy} = \text{floor}\left[\frac{\text{DVC\_frame\_capacity} \cdot \text{DVC\_frame\_rate}}{\text{MPEG2\_bit\_rate}}\right]$$

Referring to FIG. 5, to control the redundant storage of MPEG data, the receiver 104 accumulates 756,000 bits (one DV frame of data) in an accumulation buffer 158 as the MPEG transport stream data arrives at the receiver 104 from the emission station 100. When this quantity of data has been accumulated, it is placed in the data section of a DV frame 50. This data is repeatedly output to the frame packetizer 150 while the next 756,000 bits of data are received from the emission station 100 and accumulated. The DV packet 30 is sent to the video recorder 154 and the new accumulation of data is then placed in a new DV frame with a redundancy number incremented by one from that of the previous DV frame. The process is repeated until the entire MPEG transport stream is stored.

When the stored video is played, the data in the DV frames stored on the tape is sent from the recorder 154 to the receiver 104. The MPEG ID field 88 of MPEG header 80 (see FIG. 7) is used to identify the data in the DV frames as MPEG transport stream data. The offset field 94, see FIG. 7, is used to reconstruct the MPEG-2 transport stream. The offset specifies the position of the MPEG data in the DIF block relative to the MPEG data from other DIF blocks of the current DV frame or in redundant frames. Preferably, the first DIF block of a DV frame has an offset of zero. If this DIF block contains 70 bytes of data, then the offset number of the next DIF block would be 70.

The transport stream is reconstructed by extracting the MPEG data from the IEEE 1394 packets in a reconstruction depacketizer 159 and then placing the MPEG-2 data from each of the DIF blocks 54 into a reconstruction buffer 156, illustrated in FIG. 5. The location of specific data in the reconstruction buffer 156 is the sum of the offset value 94 and a frame storage index equal to one byte past the last storage location used by the DVC frames having the previous redundancy value. The frame storage index is initially set to zero. If any DIF blocks are missing, redundant DIF blocks 54 from redundant DV frames can be placed into the reconstruction buffer 156. When a frame with a new redundancy value is received, the frame storage index is set to one byte past the last byte stored with the previous redundancy value 92. The MPEG data from the redundant frame is then stored at the location identified by the sum of the offset value 94 of the DIF block and the frame storage index. Data from each set of frames with a new redundancy value 92 is appended to the data in the reconstruction buffer 156. A discontinuity in the redundancy value would indicate that a new or discontinuous MPEG-2 transport stream is being received.

The method and apparatus of the present invention may be used to store data other than MPEG-2 transport stream data on DV tape. For example, files from a. PC hard disk or other data that may or may not be related to stored MPEG transport stream data (such as web page uniform resource locators (URLs), recording time, or system information) could be stored on DV tape utilizing the method. Further, if the data rate capacity of the DV tape exceeds the data rate of the MPEG transport stream, ancillary data can be stored by the DV recorder utilizing the method. Such ancillary data could include trick play frames to aid in trick play operation (such as, fast forward or reverse operation) of the video recorder. The trick play mode data may include MPEG frames stored redundantly on the tape to ensure that data is can be retrieved during fast play modes.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of processing data comprising the steps of:
   (a) copying from a storage medium a plurality of DV-formatted DIF data blocks arranged in a sequential order according to the DV format standard, each DIF data block containing a header section and a payload section separate from said header section, said data stored in the collective respective payload sections of at least one DIF data block;
   (b) in said sequential order, extracting said data from said respective payload sections of at least one DIF data block;
   (c) arranging at least a portion of said data into a format other than DV-formatted data in a manner that maintains said at least a portion of said data in said sequential order, without transcoding any of said data from a DV format to said format other than DV-formatted data; and
   (d) forwarding said portion of said data to a decoder capable of decoding said portion of said data for presentation to a user.

2. The method of claim 1 where said format other than DV-formatted data is an MPEG format.

3. The method of claim 2 where the payload section of each said DV-formatted DIF data block contains an MPEG header and MPEG data separate from said MPEG header.

4. The method of claim 3 where said MPEG header contains a first section indicating the existence of MPEG data in said DIF data block and a second section indicating an offset value used to specify the position of MPEG data in said DIF data block relative to MPEG data in other DIF data blocks.

5. The method of claim 4 wherein said DV-formatted DIF data blocks are arranged in DIF frames, each DIF frame containing multiple said DIF data blocks, wherein a plurality of MPEG headers stored in respective DIF data blocks have the same offset value, and wherein every MPEG header in said portion of said data includes a unique offset value.

6. The method of claim 4 said DV-formatted DIF data blocks are arranged in DIF frames, each DIF frame containing multiple said DIF data blocks, wherein a plurality of MPEG headers stored in respective DIF data blocks have the same offset value, indicating redundantly-stored MPEG data.

7. A method comprising the steps of:
   (a) copying from a storage medium a plurality of DV-formatted frames, each frame having a plurality of DIF data blocks arranged in a sequential order according to a DV format standard, each DIF data block containing a header section and a separate payload section, said payload section storing data comprising an MPEG header section and an MPEG data section separate from said MPEG header section;
   (b) extracting said data from respective said payload sections of at least one DIF data block;
   (c) selecting a portion of said data and arranging said portion of said data into MPEG-formatted data comprising blocks of MPEG data respectively extracted, without transformation, from respective payload sections of DIF blocks, the arrangement of said blocks of MPEG data relative to each other preserving said sequential order, wherein said portion of said data is less than all of said data; and
   (d) decoding said MPEG formatted data for visual presentation to a viewer.

8. The method of claim 7 where said plurality of DV-formatted frames includes respective DIF data blocks redundantly storing duplicate MPEG header sections and MPEG data sections, and including the steps of:
   (a) detecting missing MPEG data from said portion of said data;
   (b) locating said missing MPEG data in a payload portion of a DIF data block redundantly storing said MPEG header and data sections, not in said portion of said data;
   (c) inserting said missing data into said portion of said data prior to said step of decoding.

9. The method of claim 8 where each said MPEG header section includes an offset value, where redundant data is stored in respective DIF blocks comprising an MPEG header section having the same offset value, where said offset value is used to select blocks of MPEG data for inclusion within said portion of said data.

10. The method of claim 9 where the offset value of the MPEG header in the payload section of a respective DIF block, that is not redundant of the sequentially previous DIF data block, is equal to the number of bits of MPEG data in said sequentially previous data block plus the offset value of said sequentially previous data block.

* * * * *